UNITED STATES PATENT OFFICE 2,219,668

PRODUCTION OF ETHYL ALCOHOL

Lee A. Underkofler, Ames, Iowa, and William K. McPherson, Atchison, Kans., assignors to The Chemical Foundation, Incorporated, a corporation of Delaware No Drawing. Application March 22, 1938, Serial No. 197,425

4 Claims. (Cl. 195—15)

This invention relates to the production of alcohol, more particularly to the production of ethyl alcohol by enzymatic conversion of amylaceous materials.

As is known, in order to produce ethyl alcohol from cheap starchy materials it is first necessary to convert the starch to fermentable sugars. This step, known in the art as saccharification, comprises essentially a hydrolysis of the starch to certain specific sugars. To secure optimum yields of alcohol, the amylaceous starting materials should be converted quantitatively to maltose and dextrose. In actual practice, using the best conversion agents such a specific and quantitative conversion has not been achieved.

While such a saccharification theoretically may be effected with a number of different agents, such as suitable mineral acids and enzymes, it is a fact that, even after centuries of experimentation with and commercial use of this reaction, barley malt is still the most effective agent for this step.

The production of alcohol from amylaceous materials involves, as is known, the following steps: gelatinization of the starch, usually by heating with water under pressure; cooling to the mashing temperature and mashing with barley malt; cooling and fermenting the wort or sugar solution thus formed with a suitable yeast to convert the sugar to alcohol and carbon dioxide. In brewing practice the aqueous alcohol thus produced, after suitable filtration and clarification, constitutes the final or end product. In distillery practice the beer is concentrated to an aqueous alcohol of higher alcoholic concentration by distillation methods. In different processes different specific adjuvants are added either to the mash or to the wort for the purpose either of influencing the flavor of the resulting product or for the purpose of supplying nutrient agents to the yeast.

In all prior practice, i. e., either in brewing or distilling, the malting material constituted a most expensive ingredient. This material is expensive because of the relatively large amounts necessary and particularly because of the investment, in both plant equipment as well as in labor, involved in its production. The barley malt employed is germinated barley. In ordinary practice one bushel of barley (48 lbs.) yields only about 34 lbs. of malt, and this only by a long procedure which must be conducted very carefully. In fact, the preparation of the malt is one of the most prolonged and expensive steps in the entire process.

As is known, according to one method, such preparation involves the cleaning and grading of the barley, the steeping of the barley at accurately controlled temperatures for a period of from 50 to 70 hours, more or less, and during which the material must be aerated. In the production of distillers' grains, adjuvants such as calcium bisulfite are usually necessary in order to inhibit the growth of mold and bacteria. Thereafter the barley must be spread out or couched on the malting floor to depths usually not exceeding 12 inches and maintained under very carefully controlled conditions of temperature and oxygen respiration. During this period the barley must be turned over and aerated from time to time and must be kept sufficiently moist, as by sprinkling and the like. Usually this operation is so conducted that the temperature does not exceed 60° F. In the production of distillery malt the germination is usually allowed to proceed for about three weeks until the acrospire has grown out and the rootlets are more than twice the length of the grain. Such malt is termed the "long" malt and possesses the maximum diastatic power. Such a malting operation is therefore protracted and involves a considerable tie-up of capital in plant equipment.

Similarly, in the pneumatic system of malting, a prolonged period of time and a larger capital investment is involved.

The malting of other grains, such as rye, involves the same general steps and similarly requires a protracted and carefully controlled treatment which is reflected in the price of the material.

In what may be considered typical distillery practice, about 0.225 bushel of barley is required for each bushel of corn, i. e., 88 per cent. of grain and 12 per cent. of malt. Even under the most carefully controlled malting and mashing conditions the yields obtained, in terms of alcohol, are only about 85 per cent. of that theoretically possible. Such a relatively low yield is due to the fact that the barley malt, or other malting material, does not convert all of the starch to dextrose and maltose, but leaves a considerable amount of it in the form of dextrine which cannot be utilized by the yeast. Therefore, the combination of high initial cost of the barley malt, coupled with its relatively low conversion power, has been a major contributing cause to the relatively high cost of alcohol.

The art has long recognized these factors and many attempts have been made to utilize other saccharification methods. Thus, other germinated grains, such as corn and rye, and other vegetable materials, such as soy bean, have been suggested as saccharifying agents. These, however, present the same general disadvantages of the barley malt, more particularly, a relatively low converting power. Again, amyloclastic molds, such as the Aspergilli and Mucors, have been investigated for this purpose. It has been proposed to grow these molds on an unsaccharified grain mash so as to produce alcohol. During growth, such molds secrete considerable quantities of diastase which then becomes available to convert the starch to fermentable sugars. Upon the addition of yeast, these sugars may be converted to alcohol. This type of material is, of course, much cheaper to produce than the grain malts but insures only relatively low alcohol yields.

As a result of considerable experimentation, a highly improved method of saccharifying amylaceous materials and of producing alcohol therefrom has been developed. The new method is based upon two discoveries which, under the invention, may be utilized separately but which, as will be more fully appreciated, are preferably used conjointly.

It has been found, initially, that the saccharifying action of fungal amylases may be enhanced greatly by utilizing a special method of development. It has been found further that, when the diastatic material produced by this method is employed in conjunction with cheap vegetable diastatic material, such as soy bean, a surprising and unpredictable increase in saccharification action is secured. While no precise explanation of the mechanism of such increased yields is advanced, it would seem that the conjoint use of these materials, as it were, establishes a diastatic base of widened and balanced specificity. Whatever may be the action taking place, it is a fact that the use of the two materials insures a saccharifying action which is much greater than that secured by equivalent amounts of either product used separately.

In practicing the invention, a suitable mold, such as *Aspergillus oryzae* is grown on a sterilized bran. It has been found that a medium containing substantially 40 per cent. of bran and substantially 60 per cent. of water produces excellent results. During growth, special precautions should be taken to maintain the temperature within relatively narrow, optimum limits, to insure an adequate oxygen supply and to remove the carbon dioxide formed. In the preferred method, the sterilized bran is inoculated with spores of the Aspergilli and is maintained at a temperature below 40° C., and preferably between 25° C. and 35° C., for a period of from 24 to 72 hours.

While such a treatment may be carried out in any desired manner, it has been found that improved results are secured by carrying out the treatment in a slowly rotating drum which is equipped for aeration. During the development period, air, at the proper temperature, should be pumped over and/or through the bran in amounts so controlled as to maintain the temperature within the stated range and to insure adequate oxygen respiration. In these circumstances, a luxuriant growth of mycellium, high in diastase, is produced. This product, i. e., *Aspergillus oryzae*, grown on bran is designated in the claims as taka diastase.

The product may be employed in the manner known to those skilled in the art to saccharify a starchy material. It has been found, as a result of repeated tests, that the best mashing temperature is between approximately 50° C. and 60° C., and that the minimum addition of the mold is approximately 10 per cent. of the weight of the grain employed. The improved product preferably should be employed in finely ground form or as a water dispersion in order to produce the maximum saccharification and should be utilized only after the starch is cooked, as is now the practice with barley malt.

While it is difficult to determine the precise modification of the diastatic material, as a result of the improved treatment, it is a demonstrated fact that this treatment does markedly increase the saccharogenic power of the product. It is, of course, known that the *Aspergilli oryzae* amylase is generally similar to other amylases. This particular product is generally characterized by a lower nitrogen content than other malting material. A characteristic of the typical Aspergillus is that, although it possesses a relatively high amyloclastic action, it has a much smaller saccharogenic action than most of the active malt preparations. The product produced according to the present invention, however, is characterized by a greatly increased saccharogenic power. For example, in actual use it has been found that, utilizing this mold as a saccharifying agent, yields of alcohol equivalent to 85 per cent. of theoretical are attained. In other words, the improved mold mycellium-bran mixture is the substantial equivalent of barley malt in diastase content and in saccharogenic action. As will quickly be appreciated, the cost of producing this saccharifying agent is greatly less than that of barley malt and its use commensurately reduces the cost of alcohol production.

In further experimentation, it has been found that soy bean, in sufficiently highly dispersed form, provides a valuable saccharifying agent. It has been determined that soy bean, in ground form, and especially when dispersed in water, at 15° C. to 25° C., gives saccharifications only a little below that obtainable with barley malt or with the improved mold preparation described above. For example, when soy bean, in a water dispersion, is used with grain, in the proportion of 1 part of soy bean and 10 parts of grain, it is possible to secure alcohol yields up to 85 per cent. of theoretical.

It is particularly to be observed at this point that the use of soy bean as a saccharifying agent, as contemplated herein, is carefully to be distinguished from prior suggestions of its employment as a nutrient for yeast, or for the purpose of imparting flavoring principles to a distilled liquor (by reason of the amino acid decomposition products). In the present process the soy bean is employed for its saccharogenic action. For this purpose the soy bean from any source may be employed, provided the diastatic properties are not destroyed or impaired. Thus, under the invention, ground soy bean, crude pressed residues, and the like, may be utilized. Residues from solvent extraction processes or from other methods in which the enzyme may be inactivated, by reason of thermal or chemical treatment, are not effective for the purposes of the invention. Such material which is available for the use of the invention is designated herein as diastatically active soy bean material.

When the special highly dispersed soy bean is used as the sole saccharifying agent, it is preferable, as noted, to utilize it in a condition of optimum fineness, as for example in a water dispersion. A characteristic of the soy bean diastase which is of considerable importance is its relatively greater resistance to heat than that of barley malt diastase or the special mold diastase described hereinbefore. This thermal characteristic thus enables the use of higher mashing temperatures than is customary with barley malt. Thus, it has been found that best results are secured by adding the ground or dispersed soy bean to the mash at a temperature of from substantially 70° C. to 80° C., and allowing the mashing to proceed at this temperature for a period of from about 30 to about 45 minutes. However, due to the refractory characteristics of the soy bean disastase, it is also feasible to add the soy bean malt to the mash at a temperature of about 100° C. and then cool the mash down to about 60° C. in a period of 15 minutes. This temperature may then be held for the remainder of the mash period, that is to say, for about 30 minutes longer.

After either of these mashing steps, the mash may be cooled down to the fermenting temperature, about 30° C., pumped to the fermenter, inoculated with yeast and allowed to ferment for from 2 to 3 days in the usual manner. In these circumstances alcohol yields of from 80 to 85 per cent. of theoretical are secured.

As indicated hereinbefore, unexpectable high alcohol yields are obtained by conjointly utilizing soy bean diastase and mold diastase in the saccharification step.

In effectuating this phase of the invention, the soy bean and mold preparation may be used in an admixture, or they may be added sequentially to the mash. As already pointed out, the diastase of the soy bean is somewhat more refractory than that of either barley malt or the diastatic mold preparation. Hence, when the malting materials are added sequentially, best results are secured by first adding the diastatic soy bean component at a temperature of from 90° C. to 100° C., then cooling down to between 50° C. and 60° C. before adding the diastatic mold component. This temperature of 50° C. to 60° C. may then be held for the remainder of the saccharification period, that is to say, for about 30 minutes longer.

When the materials are added to the mash as a mixture it is preferable to first reduce the cooked mash to a temperature of substantially 60° C., add the mashing material and then allow saccharification to proceed at this temperature for a period of about 30 minutes.

The relative quantities of the respective materials may be quite widely varied. It has been found that a mixture of 6 parts of ground soy bean and 4 parts of the mold preparation for every 100 parts of grain constitutes an effective percentage. Other proportions however may be utilized, as for example, from about 3 to 5, or more, parts of soy bean and from 2 to 6, or more, parts of mold per hundred parts of grain.

It will be observed that, when mashing is carried out in the two steps or stages, i. e., by first adding the soy bean and then subsequently adding the mold preparation, the hydrogen ion concentration of the mash may differentially be adjusted, at the two stages, so as to secure the maximum saccharification action.

It will be understood that the special mashing procedures described herein may be employed with other mashing procedures. Thus, for example, saccharification of grains may be effected by subjecting a mash to a partial hydrolysis by means of treatment with mineral acids and the partially hydrolyzed mash may then be treated according to any one of the several methods described herein. In these circumstances, the quantity of the diastatic material should be adjusted to the diminished requirements.

It will also be understood that, when the exigencies of a particular operation so indicate, the saccharifying agent may comprise a combination of improved mold preparation and soy bean diastase, together with other diastatic material, such as barley, rye or corn malt. When such a multiple agent is employed, it may be brought into the mashing step either as a complete dry mix or as a water dispersion, or the several components may be added sequentially in a manner hereinbefore described. While specific preferred methods of effectuating the invention have been described, it is to be understood that these are given as illustrative of the broad underlying principles involving the utilization of cheap, efficacious, diastatic material for the saccharification of starches for the production of alcohol or for any other desired purpose.

We claim:

1. That method of producing fermentable sugars which comprises, saccharifying starch with a mixture of from two to six parts of taka-diastase and from three to five parts of diastatically active soy bean from 100 parts of starch.

2. A method of producing ethyl alcohol from grain which comprises cooking the grain, reducing the temperature of the cooked grain to between substantially 60° C. and 50° C. mashing the material thus produced with a mixture of enzymatically active soy bean material and *Aspergillus oryzae* developed on bran, in the proportions of substantially 6 parts of soy bean material and substantially 4 parts of said diastatic bran per 100 parts of grain; saccharifying the mash at substantially the said temperature for a period of substantially 45 minutes; then reducing the temperature of the mash to substantially 30° C.; inoculating with yeast and effecting fermentation of the fermentable sugars contained in the saccharified material.

3. That method of producing fermentable sugars which comprises, saccharifying starch with a water dispersion of a mixture of from 2 to 6 parts of taka diastase and from 3 to 5 parts of diastatically active soy bean per 100 parts of starch.

4. A method of saccharifying amylaceous materials to produce fermentable sugars which comprises, cooking the amylaceous material, adding diastatically active soy bean to the mash while the latter is at an elevated temperature of the order of from 90° C. to 100° C., cooling the mash to a temperature of the order of 60° C. and then adding taka-diastase to the mash and completing the saccharification at such lower temperature.

LEE A. UNDERKOFLER.
WILLIAM K. McPHERSON.